US010791207B2

(12) United States Patent
Fournier et al.

(10) Patent No.: US 10,791,207 B2
(45) Date of Patent: Sep. 29, 2020

(54) METHOD AND APPARATUS FOR ATTACHING DISPLAY TO ENCLOSURE

(71) Applicant: Apple Inc., Cupertino, CA (US)

(72) Inventors: Douglas G. Fournier, San Jose, CA (US); Daniel W. Jarvis, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/373,412

(22) Filed: Apr. 2, 2019

(65) Prior Publication Data

US 2020/0092407 A1 Mar. 19, 2020

Related U.S. Application Data

(60) Provisional application No. 62/731,247, filed on Sep. 14, 2018.

(51) Int. Cl.
| | | |
|---|---|---|
| *G09G 3/36* | (2006.01) |
| *G09G 3/30* | (2006.01) |
| *H04M 1/02* | (2006.01) |
| *G06F 1/16* | (2006.01) |
| *G06F 3/041* | (2006.01) |

(52) U.S. Cl.
CPC ........ *H04M 1/0268* (2013.01); *G06F 1/1643* (2013.01); *G06F 1/1652* (2013.01); *G06F 3/0414* (2013.01); *H04M 1/0216* (2013.01); *H04M 2201/38* (2013.01)

(58) Field of Classification Search
CPC ....................... G09G 2380/02; G02B 26/00–10
See application file for complete search history.

(56) References Cited

U.S. PATENT DOCUMENTS

| | | | |
|---|---|---|---|
| 9,086,850 B2 | 7/2015 | Verschoor et al. |
| 9,235,239 B2 | 1/2016 | van Dijk et al. |
| 2009/0257207 A1 | 10/2009 | Wang et al. |
| 2011/0050657 A1* | 3/2011 | Yamada .............. H01L 51/5237 345/204 |
| 2012/0146886 A1* | 6/2012 | Minami .............. H01L 27/3276 345/80 |
| 2013/0081756 A1* | 4/2013 | Franklin ................. B29C 53/04 156/221 |

(Continued)

FOREIGN PATENT DOCUMENTS

| | | |
|---|---|---|
| CN | 102047645 A | 5/2011 |
| EP | 3079033 A1 | 10/2016 |
| WO | 2018057652 A1 | 3/2018 |

*Primary Examiner* — Sanghyuk Park
(74) *Attorney, Agent, or Firm* — Dorsey & Whitney LLP

(57) ABSTRACT

An electronic device having a display assembly and housing is disclosed. Several layers may combine to form the display assembly including a display layer. The display assembly can also include a support structure. The display layer may have a planar portion configured to present visual information and a curved portion. The display assembly can additionally include a transverse support member that extends away from the curved portion. The transverse support member may have a central portion that is coupled to at least the curved portion and at least one end portion coupled to the support structure. The transverse support member can define at least one separate load path capable of transferring a corresponding load from the display layer to the support structure.

20 Claims, 9 Drawing Sheets

(56) References Cited

U.S. PATENT DOCUMENTS

| | | | |
|---|---|---|---|
| 2014/0217382 A1* | 8/2014 | Kwon | H01L 51/5246 257/40 |
| 2015/0036300 A1* | 2/2015 | Park | H01L 51/5253 361/749 |
| 2015/0342064 A1 | 11/2015 | Russell-Clarke et al. | |
| 2016/0210103 A1* | 7/2016 | Yoshizumi | H01L 51/0097 |
| 2017/0126865 A1 | 5/2017 | Lee | |
| 2017/0171989 A1 | 6/2017 | Kim et al. | |
| 2018/0241115 A1 | 8/2018 | Cho et al. | |
| 2018/0364760 A1 | 12/2018 | Ahn et al. | |

\* cited by examiner

METHOD AND APPARATUS FOR ATTACHING DISPLAY TO ENCLOSURE

CROSS-REFERENCE TO RELATED APPLICATIONS

The present application claims the benefit of U.S. Provisional Application No. 62/731,247, entitled "METHOD AND APPARATUS FOR ATTACHING DISPLAY TO ENCLOSURE," filed Sep. 14, 2018, the content of which is incorporated herein by reference in its entirety for all purposes.

FIELD

The following description relates to electronic devices. In particular, the following relates to an electronic device that includes a display assembly having several active layers including a display layer that can be coupled to a support structure of the electronic device in various ways.

BACKGROUND

An electronic device may include a display assembly that can be coupled to a support structure or enclosure of the electronic device to secure the display assembly. The coupling may help prevent separation of the display assembly from the support structure during normal use of the electronic device as well as during a drop event. Accordingly, such a coupling may need to prevent or minimize relative movement of the display assembly with respect to the support structure during the drop event to maintain the integrity of the electronic device.

SUMMARY

In one aspect, an electronic device having a housing is described. The electronic device includes at least a display assembly carried by the housing and comprising planar components secured together to form a stacked assembly. The display assembly can include a display layer including a planar portion extending along and disposed about a centerline and configured to present visual information and a curved portion that curves about an axis that is transverse to and offset from the centerline. The portable electronic device also may include a support member transverse to and offset from the centerline and aligned with the axis, the support member can have a central portion that is secured to the display layer at the curved portion, thereby maintaining structural integrity of the stacked assembly, and at least one end portion coupled to a support structure.

In another aspect, an electronic device is described. The electronic device can include a display assembly including a display layer that may extend along a centerline and can have a planar portion and a curved portion. The display layer can comprise an active region having imaging elements configured to present visual information, and an inactive region that may include an overlap region that can be defined by the curved portion and that may be symmetric about a bend axis that can be perpendicular to and offset from the planar portion. The electronic device also can include a support structure that supports the display assembly and a transverse support member that may be coupled to the support structure and the display layer, and that extends along the bend axis such that the transverse support member can form a load path capable of passing a load associated with the display assembly directly to the support structure.

In yet another aspect, an electronic device is described. The electronic device can include a housing capable of carrying components that can include a processor and an optical imaging component in communication with the processor. The components may also include a display assembly in communication with the processor and that can include a display layer that has a planar portion that can be disposed about a centerline. The display assembly may also include a support structure that can be coupled to the housing and a transverse support member that may couple together the display layer and the support structure. The transverse support member can be offset from and perpendicular to the centerline of the display layer such that the transverse support structure may provide a load path from the display layer and the support structure.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
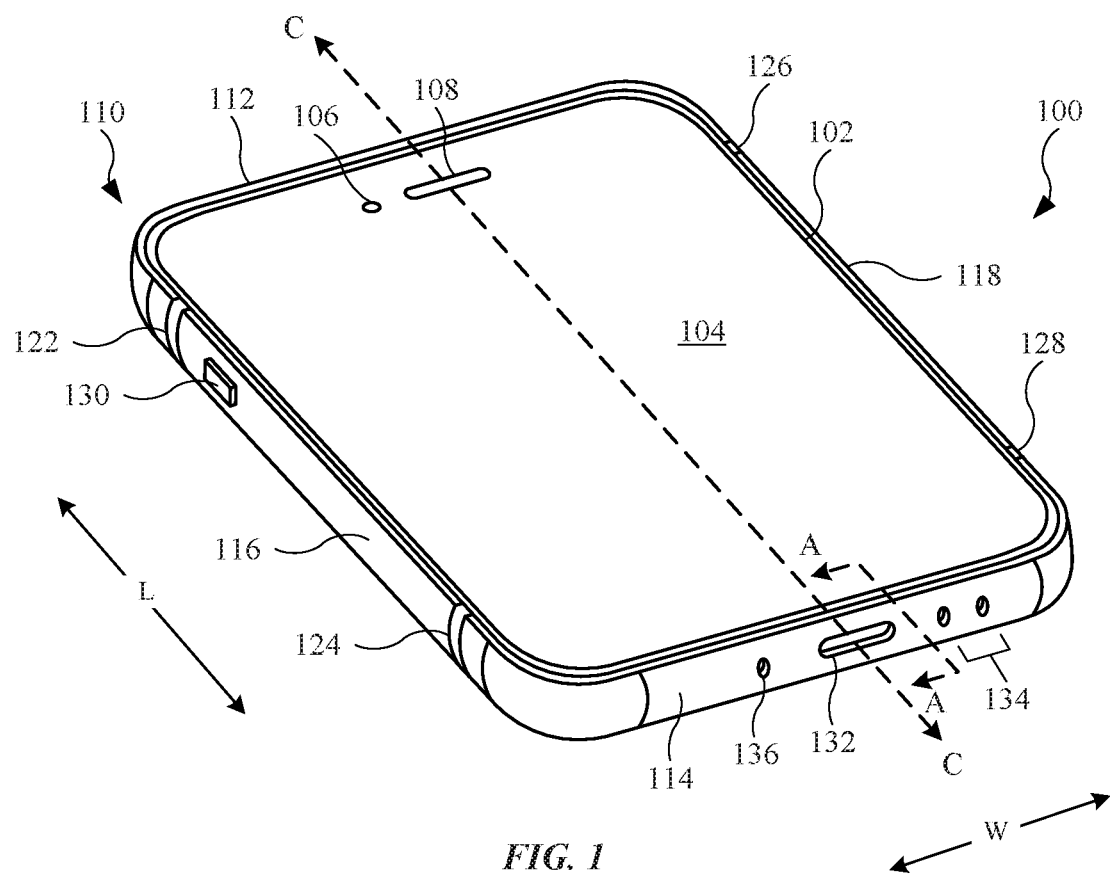
FIG. 1 illustrates a front isometric view of an embodiment of an electronic device, in accordance with some described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

Electronic devices frequently include display assemblies that are coupled to a support structure or enclosure of the electronic device. The coupling may help to prevent separation of the display assembly from the support structure during normal use of the electronic device as well as during an abnormal event, such as a drop event. Thus, such coupling may need to prevent or minimize relative movement of the display assembly with respect to the support structure.

The display assembly can include a display layer for displaying visual information and touch and force sensitive layers that may be laminated together with the display layer to provide a user input for the electronic device. The display assembly can also include a protective layer or cover glass extending over the display layer, touch sensitive layer, and force sensitive layers for protection of those layers and the electronic device itself. In a situation where the electronic device undergoes a sudden acceleration (such as a drop event), forces can be induced that can act upon components of the electronic device (such as the display assembly) that, if sufficiently great, can result in displacement of at least some of the components resulting in partial or complete loss of functionality. Consequently, robust coupling between components, such as those in the display assembly and a corresponding support structure may be necessary.

It should be noted that for the remainder of this discussion, the primary focus will be on a display assembly of a portable electronic device. However, it should be understood that the described embodiments can be used for any arrangement of components where having fixed relative positions with respect to each other is important. For example, in the context of the display assembly, the display assembly can include a stacked arrangement that can include at least a display layer capable of providing visual content. In one embodiment, the display assembly can also include a support structure capable of providing support for the stacked arrangement that, in turn, can be secured to a housing of the portable electronic device. In other embodiments, support for the stacked arrangement can be provided directly by the housing, providing for a portable electronic device having a maximally sized viewable display area. In one embodiment, a support member can be in physical communication with both the stacked arrangement and the support structure. The physical communication can define a load path between the stacked arrangement and the support structure. The load path can be arranged to maximize a robustness of the overall attachment between the stacked assembly (and any other components) and the support structure. The load path can also direct a load applied to the stacked assembly directly to the support structure. In this way, areas that are more sensitive to an applied load can be avoided.

In one embodiment, a portable electronic device can have a high component density and be characterized as having a generally rectangular shape. The rectangular shape can be defined by a major dimension (length) and a minor dimension (width) that is less than or equal to the major dimension. The display assembly can have a reduced z stack and can include a stacked arrangement of parallel planar components well suited for the high component density device. For example, a representative stacked assembly can include planar components that can include, at least, a display layer, a touch sensitive layer, and force sensitive layer each being parallel to each other and aligned in accordance with the major dimension. The display layer can be symmetric about a centerline that is aligned with and parallel to the major dimension and perpendicular to the minor dimension. The display layer can be parallel to the major dimension and include a planar portion that is contiguous with a curved portion. The planar portion can include an active region having imaging elements symmetrically disposed about a centerline and capable of producing visible content that is viewable through a protective layer that overlays the display layer. It should also be noted that by "planar" it is meant that, although generally flat, the planar portion can nonetheless have a slight curvature that could, by design, be discernable to a viewer. In addition to the active region, the display layer can include an inactive region at least a portion of which is co-planar with the active region. The inactive region is generally not visible through the protective layer, but can nonetheless include imaging elements. It should be noted, however, that the primary purpose of the inactive region is to provide a surface having an area that is of sufficient size to support multiple pathways and connections between various components of the display assembly as well as other components of the portable electronic device. Additionally, the inactive region can also facilitate securing of the display assembly.

In one embodiment, the display assembly can be secured to a support structure that, in turn, is coupled to the housing whereas in other embodiments the display assembly can be secured directly to the housing. In order to reduce an amount of space taken up by the inactive region (while still maintaining the necessary surface area), the lateral dimension of at least a portion of the inactive region can be reduced. The reduction in lateral extent can be accomplished by a curved portion of the inactive region taking on a curved, non-planar geometry that bends away from a flat portion of the inactive region. In this way, the curved portion can be symmetric about a bend axis where the bend axis is perpendicular to and displaced from the centerline of the active region. In this way, the curved portion can define an open internal volume having a generally concave geometry that can, in some embodiments, be described as a U shape. In this way, the curved portion (i) can be symmetric about the bend axis, (ii) can have flat portions of the inactive region overlapping each other, and (iii) can define an open sided internal region suitable for accommodating a support member. In the described embodiment, the support member can be located within the open sided internal region and extend outwardly in a direction aligned with the bend axis. In some embodiments, the support member can referred to as a transverse support member when aligned with the bend axis such that the support member is transverse (e.g., perpendicular) to and offset from the planar portion.

In the described embodiment, a transverse support member can be coupled to the support structure and the display layer. In this way, the transverse support member can provide a load path directly from the display layer to the support structure. Accordingly, when, for example, the display assembly undergoes an event (such as a drop event) that produces a shear force, at least part of the shear force can be directed along the load path to the support structure, or in some cases, directly to the housing. In this way, a more robust attachment can be achieved with minimal impact of available space within the portable electronic device.

It should be noted that in those embodiments that display assembly is to be wrapped around itself to provide for electrical connections to each respective layer, the overlapped portions of the wrapped area can additionally include adhesive providing attachment of the overlapped portions of a layer to one another. Nevertheless, in order to enable narrow borders around the portion of the display assembly that displays the visual information (i.e., the planar portion of the display layer), the areas in which the protective layer and/or the remainder of the display assembly can be coupled to the support structure may be limited. Accordingly, the following describes the addition of a transverse support member in a region defined by the overlapped portions of the display layer. The transverse support member can take myriad forms and the wrapped areas of the display layer (e.g., the curved portion) can be configured in various ways relative to the transverse support member and active regions (in the planar portion) of the display layer. The addition of the transverse support member helps prevent or minimize relative movement of the display assembly with respect to the support structure during the drop event while enabling narrow borders around the active region of the planar portion of the display assembly. In other words, the portions of the transverse support member extending out of the open sided internal region provide additional attachment points of the display assembly to the support structure.

The following disclosure relates to an electronic device, such as a mobile communication device that takes the form of a smart phone or a tablet computer device. The electronic device can include several enhancements and modifications not found on traditional electronic devices. For example, the display assembly of the electronic device can extend to the edges (or at least substantially to the edges) of the protective layer, thereby providing an "edge to edge" appearance of the display assembly as visual information (textual, still images, or motion images, i.e., video) are seen at or near the edges of the protective layer. Through the addition of the above-mentioned support member or transverse support member, the load path from the layers of the display assembly to the support structure may advantageously travel through the wrapped display layer and support member to the coupling of the transverse support member and the support structure, rather than being carried solely by areas of adhesive that may also secure the one or more layers of the display assembly to the support structure. As a result, these areas of adhesive can be minimized or even eliminated, further facilitating narrow borders around the display assembly.

The electronic device in which the embodiments show and describe can take the form of a wearable electronic device that can be attached to a garment worn by a user or carried with respect to an appendage (such as a wrist). These and other embodiments are discussed below with reference to FIGS. 1-10. However, those skilled in the art will readily appreciate that the detailed description given herein with respect to these Figures is for explanatory purposes only and should not be construed as limiting.

FIG. 1 illustrates a front isometric view of an embodiment of an electronic device 100, in accordance with some described embodiments. In some embodiments, the electronic device 100 is a tablet computer device. In other embodiments, the electronic device 100 is a wearable electronic device that includes one or more straps (not shown) designed to wrap around an appendage (such as a wrist) of a user to secure the electronic device 100 with the user. In the embodiment shown in FIG. 1, the electronic device 100 is a mobile communication device, such as a smartphone. Accordingly, the electronic device 100 may enable wireless communication in the form of cellular network communication, Bluetooth communication (2.4 GHz), and/or wireless local area network (WLAN) communication (2.4 GHz to 5 GHz), as non-limiting examples. As shown, the electronic device 100 may include a display assembly 102 designed to present visual information in the form of textual information, still images, and/or video information. The electronic device 100 may have a generally rectangular shape defined by a major dimension L (length) and a minor dimension (width) W that is less than or equal to the major dimension L.

In order to protect the display assembly 102, the electronic device 100 may include an outer or first protective layer 104 that overlays the display assembly 102. The first protective layer 104 may include a transparent material(s), including glass, sapphire, or plastic, as non-limiting examples. As shown, the first protective layer 104 may include openings that facilitate user interaction with the electronic device 100. For example, the first protective layer 104 may include a first opening 106 and a second opening 108. The electronic device 100 may include an image capture device (not shown) that captures an image (or images) through the first opening 106. The electronic device 100 may further include an audio module (not shown) that generates acoustical energy in the form of audible sound, which exits the electronic device 100 via the second opening 108.

Also, the electronic device 100 may include a housing or band 110 that defines an outer perimeter of the electronic device 100. Generally, the band 110 includes a shape similar to that of a 4-sided ring. However, other shapes are possible. Also, the band 110 may define multiple sidewalls and an opening to at least partially receive and secure with the first protective layer 104. In some embodiments, the band 110 includes a metal, such as aluminum or an alloy that includes aluminum. In this regard, the band 110 may provide a rigid structure for the electronic device 100. Also, when the band 110 is formed from a metal, the band 110 may include several sidewalls, some of which are used to support wireless communication. For example, the band 110 may include a first sidewall component 112 that forms a U-shape design, as well as a second sidewall component 114 that also forms a U-shape design. The first sidewall component 112 and the second sidewall component 114 may each function in conjunction with a radio circuit (not shown) in the electronic device 100 such that the first sidewall component 112 and the second sidewall component 114 each form at least part of an antenna for their respective radio circuits. For example, the first sidewall component 112 may function in conjunction with a WLAN radio circuit, and the second sidewall component 114 may function in conjunction with a cellular network radio circuit.

Also, the band 110 may further include a third sidewall component 116 and a fourth sidewall component 118, with the third sidewall component 116 and the fourth sidewall component 118 separated from both the first sidewall component 112 and the second sidewall component 114 by split regions, or openings. For example, the band 110 may include a first split region 122 and a second split region 124 that combine to separate the third sidewall component 116 from the first sidewall component 112 and the second sidewall component 114. Also, the band 110 may include a third split region 126 and a fourth split region 128 that combine to separate the fourth sidewall component 118 from the first sidewall component 112 and the second sidewall component 114. The aforementioned split regions may be filled with a non-metal material, such as molded plastic (or other non-electrically conductive material), to provide a flush, co-planar surface with the various parts of the band 110. With the first sidewall component 112 and the second sidewall component 114 being electrically isolated from the third sidewall component 116 and the fourth sidewall component 118, the first sidewall component 112 and the second sidewall component 114 may function as part of an antenna, while the third sidewall component 116 and the fourth sidewall component 118 may function as an electrical ground for one or more internal components (not shown) that are electrically coupled with the third sidewall component 116 and the fourth sidewall component 118, respectively. Also, each of the first sidewall component 112, the second sidewall component 114, the third sidewall component 116, and the fourth sidewall component 118 may provide a protective structural component for at least some internal components, as well as provide thermal dissipation and heat removal for some heat-generating components (not shown) of the electronic device 100, provided the heat-generating components are thermally coupled with at least one of the aforementioned parts. Also, the first sidewall component 112, the second sidewall component 114, the third sidewall component 116, and the fourth sidewall component 118 may each represent at least a portion of first sidewall, a second sidewall, a third sidewall, and a fourth sidewall, respectively.

The electronic device 100 may further include one or more input devices. For example, the electronic device 100 includes a first button 130 designed to generate an input when depressed. The input may generate an electrical signal sent to a processor circuit (not shown) in the electronic device 100, in order to alter the visual information presented on the display assembly 102. As shown, the first button 130 is located along the third sidewall component 116. However, other locations are possible. Also, although not shown, the electronic device 100 may include a switch designed to provide an additional user input function.

Also, the electronic device 100 may further include a data port 132 designed to receive and electrically couple with a cable assembly (not shown). The data port 132 may receive data/communication from the cable assembly, as well as electrical energy to charge a battery assembly (not shown) located in the electronic device 100. Also, the electronic device 100 may include additional openings designed for various user interactions. For example, the electronic device 100 may an audio module (not shown) located near openings 134, or through holes, formed in the second sidewall component 114. The openings 134 allow acoustical energy generated from the audio module to exit the electronic device 100. Also, the electronic device 100 may further include a microphone (not shown) located near an opening 136, or through hole, formed in the second sidewall component 114. The microphone may be positioned to receive acoustical energy through the opening 136.

Figure 2:
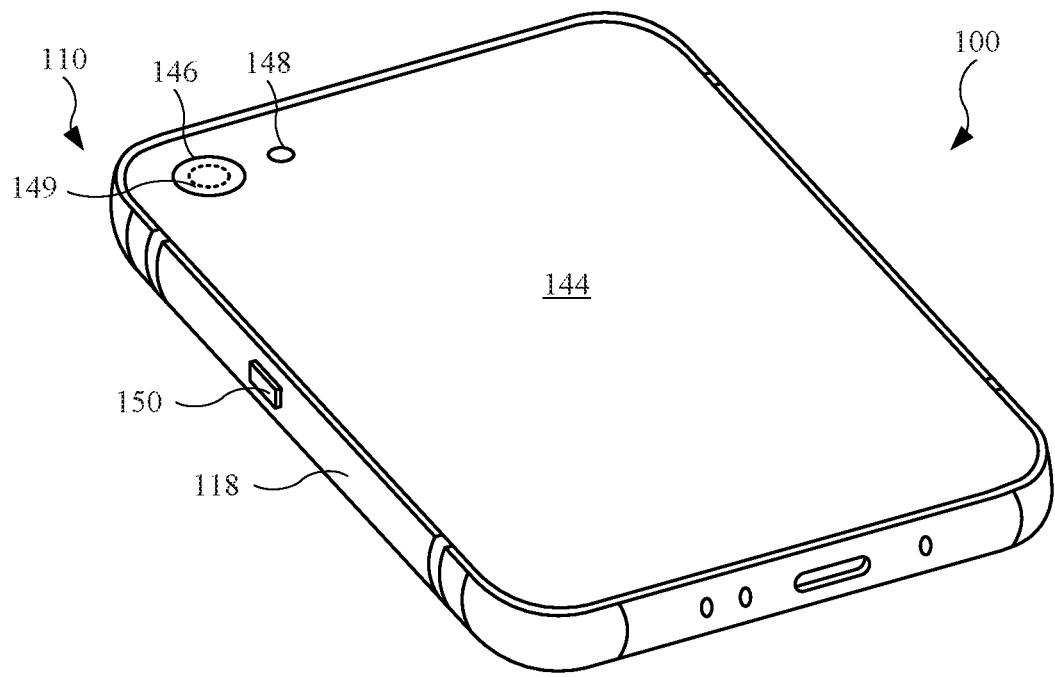
FIG. 2 illustrates a rear isometric view of the electronic device shown in FIG. 1, further showing additional features of the electronic device.

FIG. 2 illustrates a rear isometric view of the electronic device 100 shown in FIG. 1, further showing additional features of the electronic device 100. As shown, the electronic device 100 may include a second protective layer 144 secured with the band 110. The second protective layer 144 may combine with the band 110 to define an enclosure that includes an internal volume, or cavity, that receives several internal components, such as circuit boards, integrated circuits, and a battery assembly, as non-limiting examples. In this regard, the band 110 may include a first edge region that receives the first protective layer 104 (shown in FIG. 1), as well as a second edge region that receives the second protective layer 144, with the first edge region and the second edge region in opposite, or opposing, locations of the band 110. Also, the second protective layer 144 may be referred to as a bottom wall or back wall.

Generally, the second protective layer 144 may include a material (or materials) that provides an aesthetic finish, such as glass, sapphire, or plastic. Also, in some instances, the material makeup of the second protective layer 144 may allow radio frequency ("RF") communication, generated from internal radio circuits (not shown) of the electronic device 100, to permeate through the second protective layer 144. In this manner, the electronic device 100 may be in wireless communication with other devices (not shown) by way of RF communication that is substantially uninhibited by the second protective layer 144.

Also, the second protective layer 144 may include openings that facilitate user interaction with the electronic device 100. For example, the second protective layer 144 may include a first opening 146 and a second opening 148. The electronic device 100 may include an optical imaging component or image capture device 149 that captures an image (or images) through the first opening 146. The electronic device 100 may further include a flash module (not shown) aligned with the second opening 148, with the flash module generating light energy passing through the second opening 148 during an image capture event from the image capture device 149 in order to enhance image quality of the image(s) taken by the image capture device 149. Also, in addition to the first button 130 (shown in FIG. 1), the electronic device 100 may further include a second button 150 designed to generate an input when depressed, in a manner similar to that for the first button 130. As shown, the second button 150 is located along the fourth sidewall component 118. However, other locations are possible.

Figure 3A:
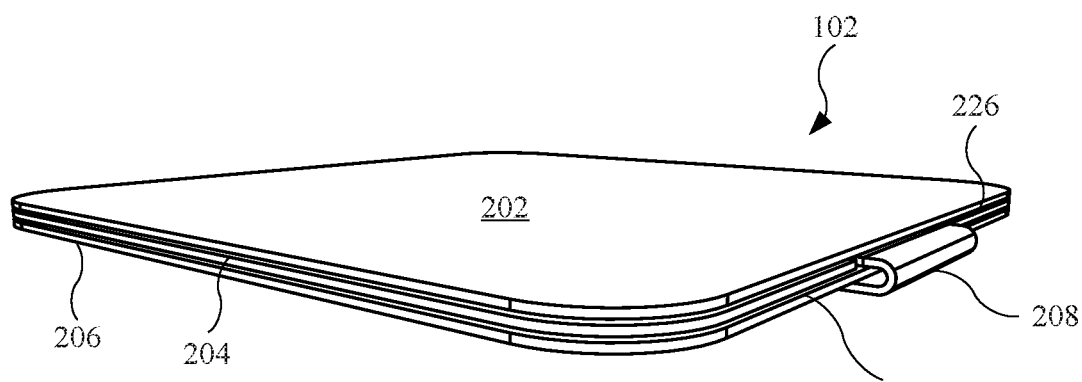
FIGS. 3A-3C illustrate a partial exploded view of the electronic device shown in FIG. 1, showing various components of the electronic device.

FIG. 3A illustrates a partial exploded view of the electronic device 100 shown in FIG. 1, showing various planar components of a stacked assembly of the electronic device 100. Several features of the electronic device 100 are not shown for purposes of simplicity. Not shown is the outer or first protective layer 104 that may overlay the display assembly 102. Also, the first protective layer 104 may adhesively secure with the display assembly 102 by an adhesive layer. As shown, the display assembly 102 may include a touch sensitive layer 202 designed to receive a touch input in order to, for example, control the information presented on the display assembly 102, a display layer 204 designed to present visual information that can, for example, be displayed about centerline C. Force sensitive layer 206 can be designed to detect an amount of force applied to, or exerted on, the display layer 204 by way a force applied to at least one of the first protective layer 104, the touch sensitive layer 202, and the display layer 204. The determined amount of force may correspond to a particular input or command to a processor circuit (not shown) that controls the display assembly 102. For example, different detected amounts of force may correspond to different or distinct commands. Also, although not shown, the display assembly 102 may include adhesive layers to adhesively secure the touch sensitive layer 202 with the display layer 204, and to adhesively secure the display layer 204 with the force sensitive layer 206.

The touch sensitive layer 202 is designed to receive a touch input when, for example, a user (not shown) depresses the first protective layer 104. The touch sensitive layer 202 may include capacitive touch-sensitive technology. For example, the touch sensitive layer 202 may include a layer of capacitive material that holds an electrical charge. The layer of capacitive material is designed to form a part of multiple capacitive parallel plates throughout a location corresponding to the display layer 204. In this regard, when a user touches the first protective layer 104, the user forms one or more capacitors. Moreover, the user causes a voltage drop across the one or more capacitors, which in turns causes the electrical charge of the capacitive material to change at a specific point (or points) of contact corresponding to a location of the user's touch input. The capacitance change and/or voltage drop can be measured by the electronic device 100 to determine the location of the touch input. Also, the touch sensitive layer 202 may include an edge region 226 that includes a connector (shown later).

The force sensitive layer 206 may operate by determining an amount of force or pressure applied to the first protective layer 104, the touch sensitive layer 202, and/or the display layer 204. In this regard, the force sensitive layer 206 may distinguish between different amounts of force applied to the electronic device 100. The different amounts of force may correspond to different user inputs. The force sensitive layer 206 may include multiple parallel capacitor plate arrangements, with one plate of each capacitor plate arrangement having an electrical charge. When a force to the first protective layer 104 causes the distance between one or more pairs of parallel plate capacitor to reduce, a change in capacitance between the one or more pairs of parallel plate capacitor may occur. The amount of change in capacitance corresponds to an amount of force exerted on the first protective layer 104.

Figure 3B:
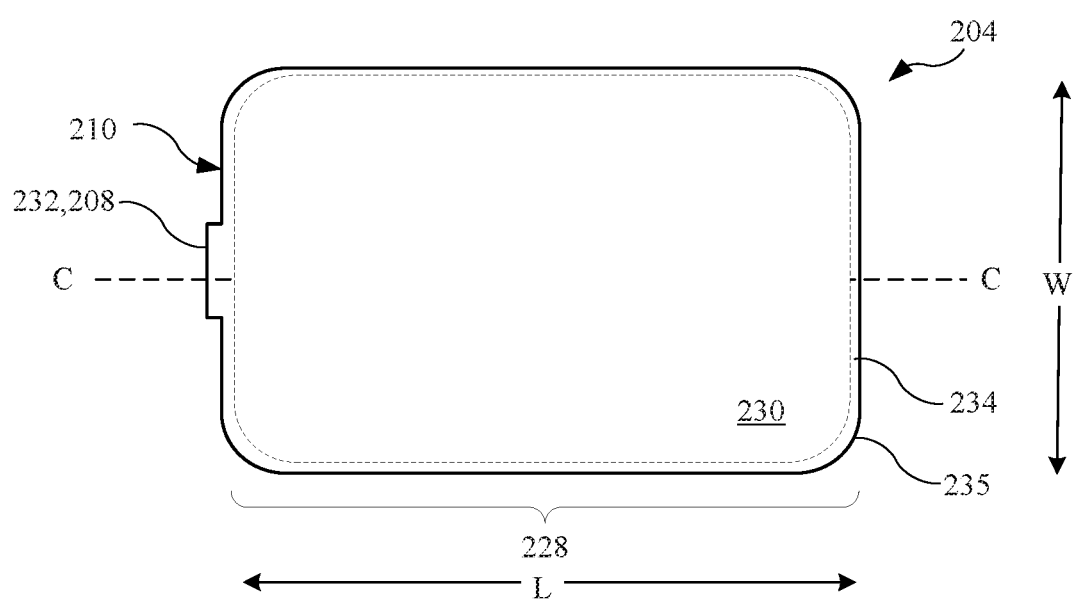

As shown in FIG. 3B, the display layer 204 (shown in top down view) includes a liquid crystal display ("LCD") that relies upon backlighting to present the visual information. Display layer 204 can include an organic light emitted diode ("OLED") display designed to illuminate individual pixels, when needed. When the display layer 204 includes OLED technology, the display layer 204 may include a reduced form factor as compared to that of an LCD display. In this regard, the display assembly 102 may include a smaller footprint, thereby creating more space for other components such as a battery assembly. Furthermore, when the display layer 204 includes OLED technology, the display layer 204 can curve or bend without causing damage to the display layer 204. For example, as shown in FIGS. 3A and 3B, the display layer 204 includes a bend 208. The bend 208 may include a 180-degree bend, or approximately 180-degree bend. The bend 208 allows the display layer 204 to bend or curve around at least a portion of the force sensitive layer 206, as shown in FIG. 3A. In some embodiments, the display layer 204 may include an active matrix organic light emitting diode ("AMOLED") display. Also, as shown in FIG. 3A, the edge region 226 of the touch sensitive layer 202 is parallel, or at least substantially parallel, with respect to the edge region 210 of the display layer 204, even when the display layer 204 includes the bend 208.

As shown in FIG. 3B, display layer 204 of the display assembly 102 can include a planar portion 228 that can extend in parallel with the major dimension L to a display periphery 235 and include an active region 230 having imaging elements symmetrically disposed about the centerline C that may be configured to present visual information viewable through the first protective layer 104 that overlays the display layer 204. It should understood that by "planar" it is meant that, although generally flat, the planar portion 228 can nonetheless have a slight curvature that could, by design, be discernable to a viewer. The display layer 204 can also include a curved portion 232 (including bend 208) contiguous with the planar portion 228. In addition to the active region 230, the display layer 204 can include an inactive region 234 at least a portion of which is co-planar with the active region 230. The inactive region 234 may not generally be visible through the first protective layer 104 but can nonetheless include imaging elements. Yet, the primary purpose of the inactive region 234 can be to provide a surface having an area that is of sufficient size to support multiple pathways and connections between various components of the display assembly 102 as well as other components of the electronic device 100. The inactive region 234 can also facilitate securing of the display assembly 102.

Figure 3C:
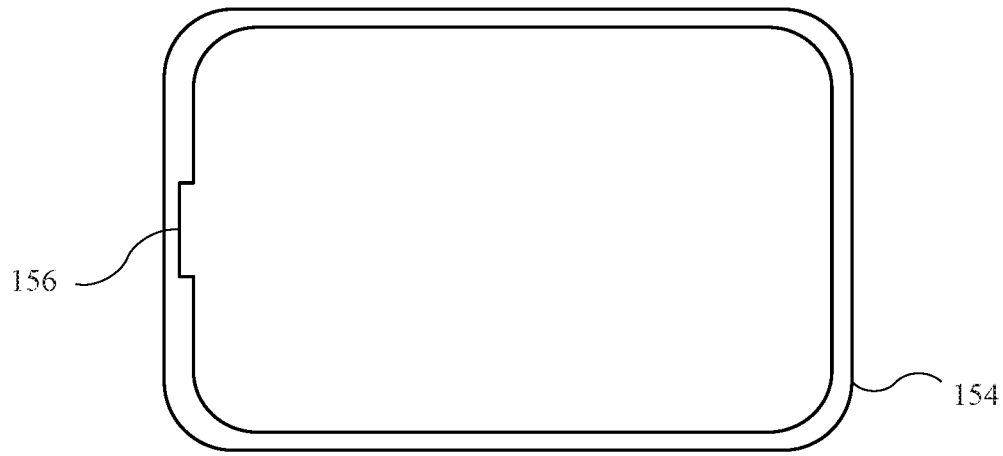

Further, in order to support the first protective layer 104 and facilitate assembly of the first protective layer 104 with the band 110 (shown in FIG. 1), the electronic device 100 may include a support structure. Specifically, as shown in FIG. 3C, the support structure can take the form of frame 154 that receives and secures with the first protective layer 104 by, for example, an adhesive layer. Accordingly, the frame 154 may include a size and shape in accordance with that of the first protective layer 104. Yet, it should be understood that the support structure could instead be the housing (e.g., band 110) of the electronic device. The frame 154 may be positioned at least partially between the first protective layer 104 and the band 110. The frame 154 may be formed from a polymeric material, such as plastic, and may also include a metal ring (not shown) that is partially embedded in the polymeric material during an insert molding operation. In this regard, the frame 154 may structurally support the first protective layer 104, as well as one or more components of the display assembly 102. It should also be noted that frame 154 can include notch 156 that can accommodate bend 208 as discussed below. It should be noted that frame 154 as shown does not include supporting element described below. It should nonetheless be considered that frame 154 can be formed of a metal in which case a supporting element is not generally required. In other cases, when the frame 154 is formed of a polymeric material, then a supporting element can be embedded with frame 154 using, for example, well known molding processes.

Figure 4:
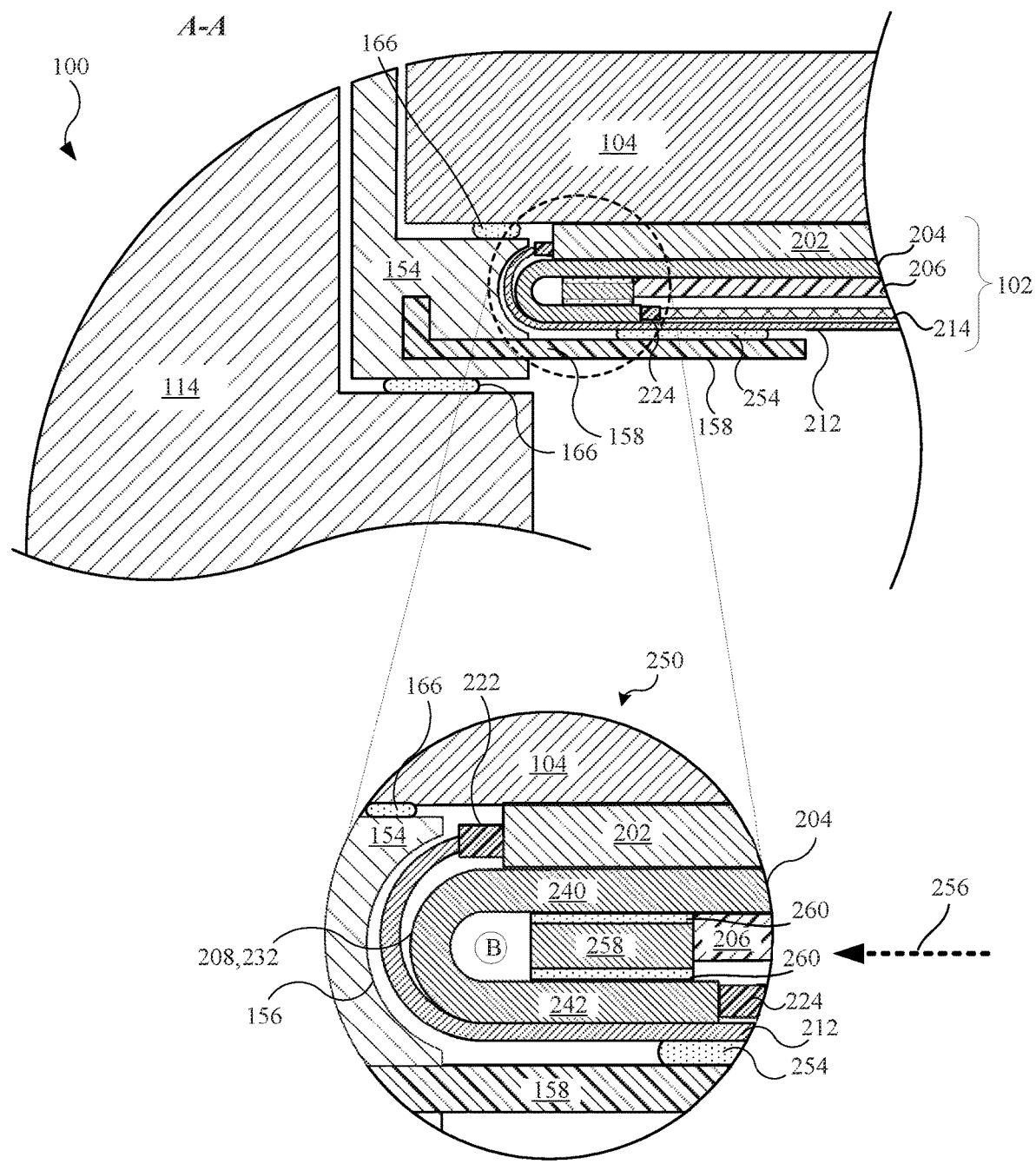
FIG. 4 illustrates a cross sectional view of the electronic device shown in FIG. 1, taken along line A-A in FIG. 1.

FIG. 4 illustrates a cross sectional view of the electronic device 100 taken along line A-A in FIG. 1. As shown, the stacked assembly includes the display assembly 102 that further includes the touch sensitive layer 202, the display layer 204, and the force sensitive layer 206. Although not shown, the display assembly 102 may include adhesive layers to adhesively secure the touch sensitive layer 202 with the display layer 204, and to adhesively secure the display layer 204 with the force sensitive layer 206. Also, the display layer 204 may include an edge region that includes a connector 224 used to electrically and mechanically couple the display layer 204 with a flexible circuit 214 that electrically couples with a circuit board assembly and places the display layer 204 in communication with the circuit board assembly.

The touch sensitive layer 202 is designed to receive a touch input when, for example, a user (not shown) depresses the first protective layer 104. The touch input can be relayed from the touch sensitive layer 202 to a circuit board assembly (not shown) by a first flexible circuit 212 electrically and mechanically coupled with the touch sensitive layer 202 by a connector 222 of the touch sensitive layer 202. The connector 222 can be located on an edge region 226 (shown in FIG. 3A) of the touch sensitive layer 202.

As shown, the first flexible circuit 212 may bend or curve around the display layer 204 and the force sensitive layer 206 to electrically and mechanically couple with touch sensitive layer 202. Thus, the touch sensitive layer 202 and the force sensitive layer 206 can each extend along and adjacent to the planar portion 228 of the display layer 204 (e.g., one on each side of the planar portion 228 of the display layer 204).

As described above, curved portion 232 of the inactive region 234 can take on a curved, non-planar geometry that bends away from a first flat portion 240 of the inactive region 234 to a second flat portion 242 of the inactive region 234. In this way, the curved portion 232 can be symmetric about a bend axis B, where the bend axis B is perpendicular to and displaced from the centerline C. Thus, the curved portion 232 can define an open internal volume having a generally concave geometry that can, in some embodiments, be described as a U shape, when viewed as a cross-section. So, the curved portion 232 can be symmetric about the bend axis B and may have flat portions 240, 242 of the inactive region 234 overlapping each other to form the U shaped open ended internal volume. The second flat portion 242 of the inactive region 234 may also overlap a portion of the active region 230 of the planar portion 228. Consequently, the planar portion 228 and curved portion 232 can define an open sided internal region.

Accordingly, the display layer 204 can have at least one display edge that is at least partially bent along the bend axis B to define the bend 208 extending between the flat portions 240, 242 of the inactive region 234 about the bend axis B. The planar portion 228 may extend along the major dimension L of the electronic device 100 (along a plane in a direction normal to the bend axis B) and the curved portion 232 can be spaced from or offset from and extend along the planar portion 228 along the major dimension L of the electronic device 100 to define an overlap region with the open sided internal region defined between the planar portion 228 and the curved portion 232 (and between flat portions 240, 242 of the inactive region of the curved portion 232).

The frame 154 may include design considerations that accommodate the display assembly 102. For example, the frame 154 may include a notch 156 having an undercut region designed to at least partially receive the flexible circuit 212 and/or the display layer 204. Thus, the frame 154 can carry the display assembly 102 and may extend at least partially circumferentially around the display periphery 235. As shown in FIG. 4, the notch 156 includes a size and shape to at least partially receive the bent/curved region of both the display layer 204 (e.g., bend 208 and curved portion 232) as well the flexible circuit 212. While the notch 156 includes a curvature generally corresponding to that of the flexible circuit 212 and the display layer 204, other shapes, including straight edges, are possible for the notch 156. Also, the notch 156 may be formed during a molding operation of the frame 154. Alternatively, the notch 156 may be formed subsequent to a molding operation by, for example, a cutting operation.

Also, the frame 154 may be adhesively secured with the first protective layer 104 and the second sidewall component 114 (of the band 110, shown in FIG. 1) by adhesive layer 166 that bonds the frame 154 to the second sidewall component 114. As shown, the amount of adhesive used in the adhesive layer 166 generally allows the second sidewall component 114, the frame 154, and the first protective layer 104 to form a generally continuous and planar configuration, as denoted by the edges of the aforementioned parts being aligned with one another. The frame 154 may include a supporting element 158 coupled to or embedded within the frame 154. In some embodiments, the supporting element 158 includes a ring formed from a metal material that continuously extends around the display assembly 102 in accordance with the frame 154. However, the supporting element 158 may also be discontinuous, and accordingly, may be selectively embedded in the frame 154. As shown, the supporting element 158 may extend along the frame 154 to support the display assembly 102 and the first protective layer 104. Also, the first flexible circuit 212 may adhesively secure with the supporting element 158 by an adhesive layer 254. During a drop event (e.g., a bottom face drop), the adhesive layers 166, 254 may experience a shear load due to the load 256 shown by dashed lines, as the display assembly 102 translates toward a contact surface (e.g., a floor).

Still referring to FIG. 4, the display assembly 102 also may include a support member 258 for reducing the shear load experienced by the adhesive layers 166, 254. The support member 258 may be disposed in and extend out of the open sided internal region and can be coupled to the support structure beyond the overlap region 250 for securing the display layer 204 to the support structure, as discussed in more detail below. For example, support member 258 can have at least one end secured to supporting element 158 in such a way shear force or load 256 acting upon display assembly 102 can at least partially be directed away from adhesive layers 166, 254 thereby reducing the likelihood of a shear failure. In some embodiments, the support member 258 can referred to as a transverse support member 258 when aligned with the bend axis B, such that the support member 258 is transverse (e.g., perpendicular) to and offset from the planar portion 228. The support member 258 will be referred to as a transverse support member 258 below; however, it should be appreciated that other arrangements of the support member 258 are contemplated.

Figure 5:
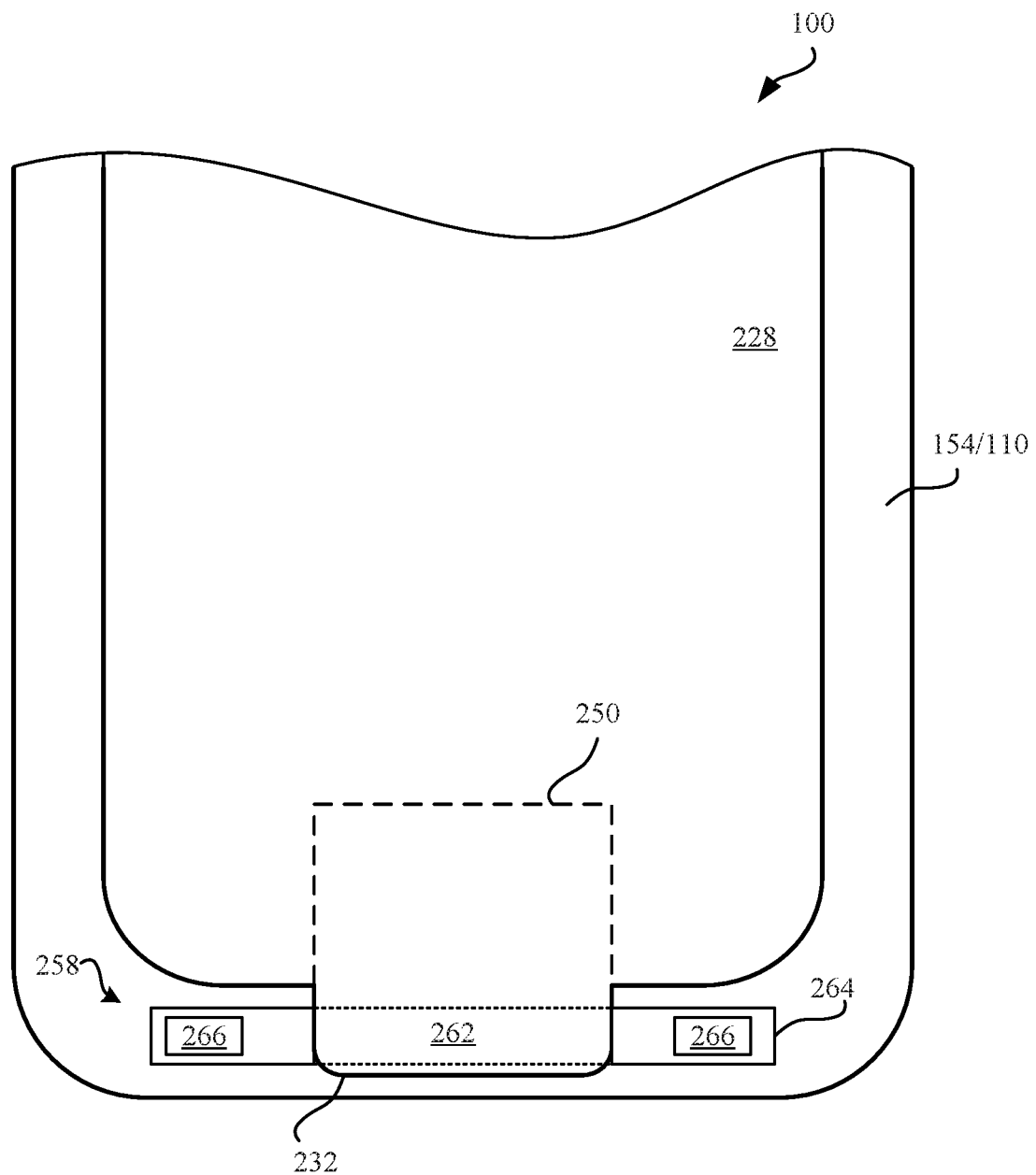
FIG. 5 illustrates a top view of the electronic device shown in FIG. 1, in accordance with some described embodiments.

FIG. 5 shows a top view of the electronic device 100 shown in FIG. 1. As shown, transverse support member 258 has a central portion 262 that is coupled to at least the curved portion 232 and at least one end portion 264 coupled to the support structure (e.g., the frame 154 or band 110). More specifically, the transverse support member 258 can extend along the minor dimension W of the electronic device 100 (along the bend axis B) to define the at least one end portion 264 outside the overlap region 250 for coupling to the support structure. In one embodiment, the central portion 262 of the transverse support member 258 can be attached to the curved portion 232 of the display layer 204 using a pressure sensitive adhesive (PSA) 260. The central portion 262 of the transverse support member 258 may also be attached to the planar portion 228 of the display layer 204 or portions thereof using the pressure sensitive adhesive 260. Nevertheless, it should be noted that transverse support member 258 can be secured to first and second flat portions 240, 242 in any manner deemed appropriate, for example using some other type of adhesive. The at least one end portion 264 of the transverse support member is shown to include a pair of end portions 264 each extending away from opposite sides of the curved portion 232 of the display layer 204; however, it should be appreciated that other configurations of the transverse support member 258 are possible.

For example, the transverse support member 258 may only extend from the open sided internal region away from one side of the curved portion 232 (i.e., only one end portion 264 coupled to the support structure). In either event, the transverse support member 258 can extend away from the bend 208 along the major dimension L of the electronic device 100. Thus, the transverse support member 258 advantageously defines at least one separate load path capable of transferring a corresponding load from the display layer 204 (and other components secured to the display layer 204) to the support structure. Consequently, the adhesive layers 166, 254 (shown in FIG. 4), especially adhesive layer 166 can be reduced in size, for example, or even eliminated altogether, allowing the display assembly 102 to extend further toward the frame 154 and/or second sidewall component 114 and providing for a narrower "border" around the display assembly 102 (i.e., maximize the size of the planar portion 228 of the display layer 204).

The transverse support member 258 may be formed of metal, for example, and can be attached to the support structure with at least one of an adhesive and a weld (both indicated as 266 in FIG. 5). It should be appreciated that the transverse support member 258 could be formed of other rigid or semi-rigid materials, such as but not limited to polymeric materials. In the event that the transverse support member 258 is formed of metal, for example, the transverse support member 258 may also assist in removing heat energy from the display assembly 102 and transferring heat energy to the support structure (e.g., the frame 154/or band 110). While the transverse support member 258 is shown extending rectilinearly, it should be appreciated that other shapes may be utilized.

Figure 6:
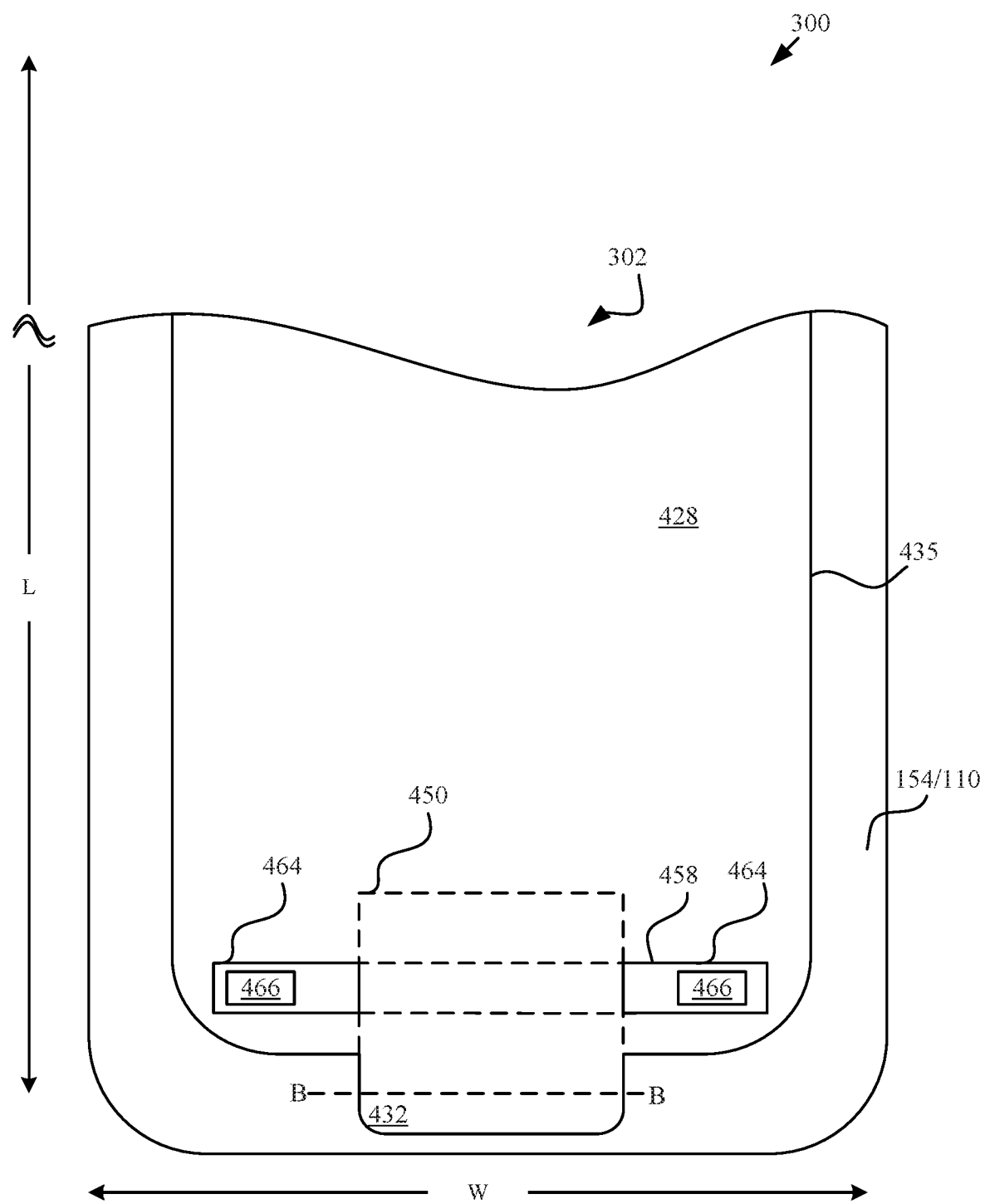
FIG. 6 illustrates a top view of an alternate embodiment of an electronic device, in accordance with some described embodiments.

FIG. 6 illustrates a top view of an alternate embodiment of an electronic device 300, with like numerals separated by a factor of 200, being used to show features corresponding to the embodiment of the electronic device 100 discussed above. In contrast to the display layer 204 shown in FIG. 5, the planar portion 428 of the display layer 404 of the display assembly 302 extends along the minor dimension W of the electronic device 300 over the pair of end portions 464 of the transverse support member 458. While the transverse support member 458 still extends along the bend axis B, it can be spaced further from the curved portion 432 along the major dimension L. Nevertheless, the transverse support member 458 still may couple to at least the curved portion 432 in the open sided internal region and within the overlap region 450 and then attach to the support structure using at least one of an adhesive and a weld (both indicated as 466 in FIG. 6). Outward portions of the planar portion 428 (portions extending outwardly along the minor dimension W of the electronic device 300 toward the display periphery 435) also may extend along the major dimension L, but stop short of reaching the bend axis B on either side of the curved portion 432.

As in the embodiment shown in FIG. 5, the transverse support member 458 of FIG. 6 can be in physical communication with both the stacked arrangement (e.g., the display assembly 302) and the support structure. The physical communication can define the load path between the display assembly 302 and the support structure. The load path can be arranged to maximize a robustness of the overall attachment between the display assembly 302 (and any other components) and the support structure. The load path can also direct a load applied to the display assembly 302 (e.g., load 256 of FIG. 4 during a drop event) directly to the support structure. In this way, stress to areas that are more sensitive to the applied load (e.g., areas of adhesive attaching the display assembly 302 to frame 154/110) can be circumvented.

Figure 7:
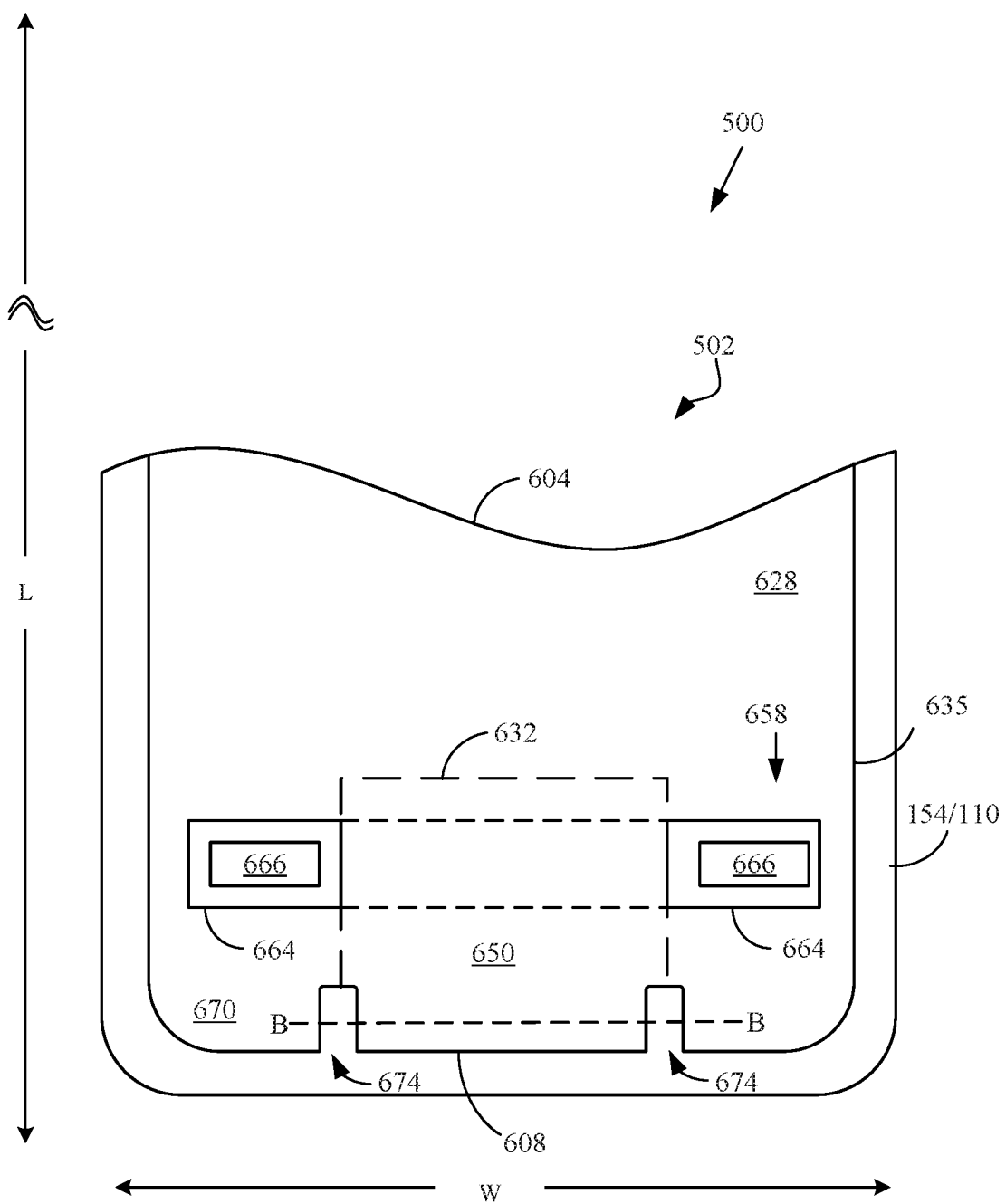
FIG. 7 illustrates a partial top view of an alternate embodiment of an electronic device, in accordance with some described embodiments.

FIG. 7 illustrates a partial top view of another alternate embodiment of an electronic device 500, with like numerals separated by a factor of 400, being used to show features corresponding to the embodiment of the electronic device 100 discussed above. As with the embodiment of the electronic device 300 shown in FIG. 6, the planar portion 628 of the display layer 604 of the display assembly 502 extends along the minor dimension W of the electronic device 500 over the pair of end portions 664 of the transverse support member 658; nevertheless, as shown, the transverse support member 658 may be closer to the bend axis B and may extend along the major dimension L of the electronic device 500 (in a direction normal to the bend axis B) further from the bend axis B. Such a transverse support member 658 could, for example, transfer a larger load from the display layer 604 to the support structure, compared to another support member that does not extend along the major dimension L in the overlap region 650 as far from the bend axis B (is narrower along the major dimension L of the electronic device 500). More specifically, the region of at least one end portion 664 that may be utilized for the weld (or adhesive) 666 to attach the transverse support member 658 to the support structure (e.g., frame 154) may be larger than if the transverse support member 658 was narrower. Similarly, because the transverse support member 658 extends further along the major dimension L of the electronic device 500, any load associated with the display assembly 502 would be more spread out to the curved portion 632 within the open sided internal region (in the overlap region 650) and less concentrated in a smaller area of the display layer 604.

Also, as shown in FIG. 7, the planar portion 628 of the display layer 604 can define gaps 674 between outward portions 670 of the planar portion 628 (portions extending outwardly along the minor dimension W of the electronic device 500 toward the display periphery 635) and the area in which the planar portion 628 is contiguous with the curved portion 632. Such gaps 674 may help minimize any stresses concentrated due to the bending of the display layer 604 at bend 608.

Figure 8:
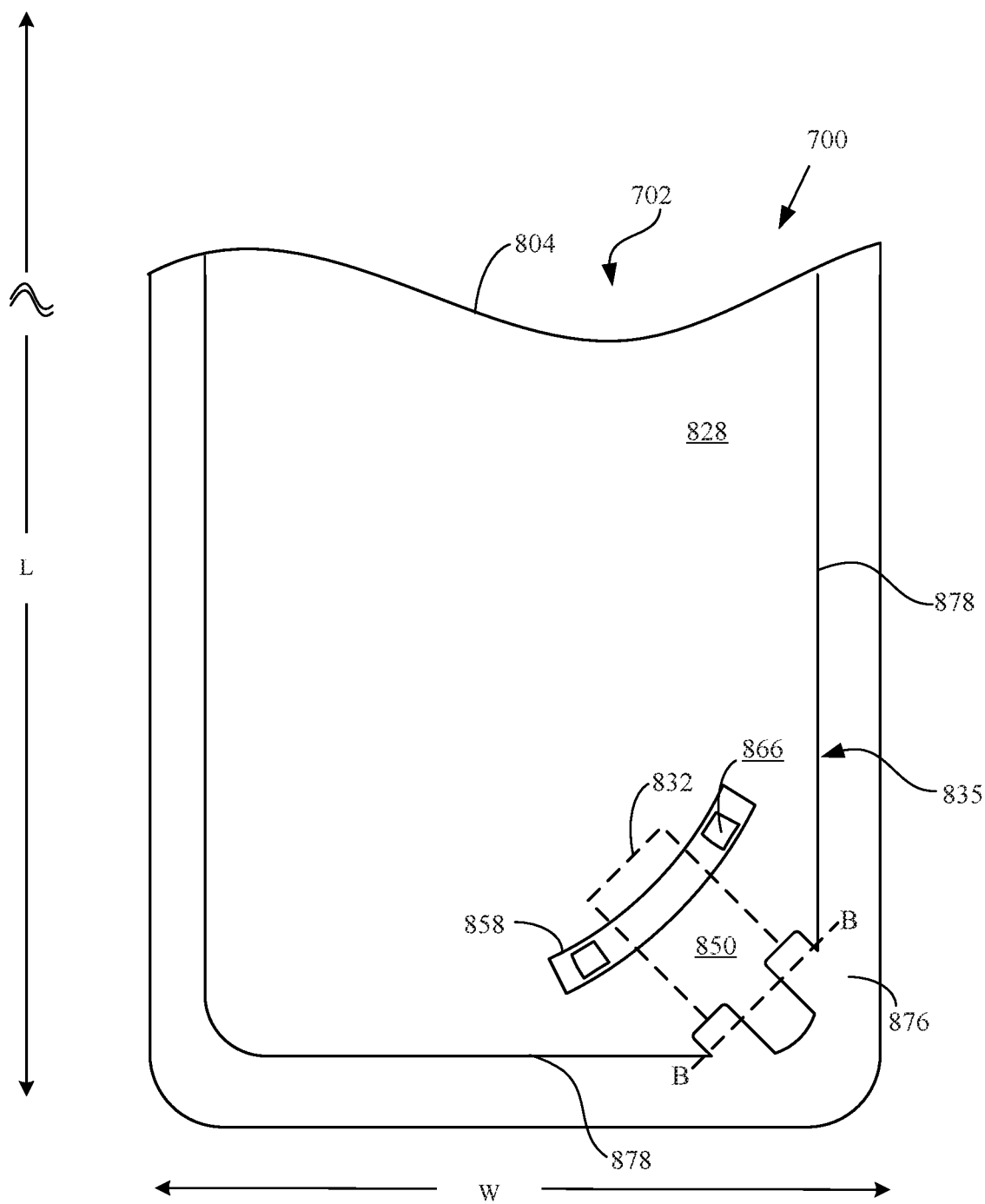
FIG. 8 illustrates a partial top view of an alternate embodiment of an electronic device, in accordance with some described embodiments.

FIG. 8 illustrates a partial top view of an alternate embodiment of an electronic device 700, with like numerals separated by a factor of 600, being used to show features corresponding to the embodiment of the electronic device 100 discussed above. As discussed above for other embodiments, the planar portion 828 of the display layer 804 can extend to the display periphery 835. As shown, the display periphery 835 can define at least one display corner 876 and the planar portion 828 of the display layer 804 may overlap the curved portion 832 in the overlap region 850 at the display corner 876. In other words, the display periphery 835 includes a plurality of display sides 878 and the bend axis B extends diagonally between two of the plurality of display sides 878.

The transverse support member 858 may have an arcuate shape to follow the shape of the display corner 876, while coupling to at least the curved portion 832 within the open sided internal region (in the overlap region 850) and to the support structure (e.g., frame 754) using at least one of a weld and an adhesive (both indicated as 866 in FIG. 8). More specifically, as shown, the transverse support member 858 can also be described as being generally L-shaped.

Therefore, the transverse support member 858 can extend along the display periphery 835 adjacent to and around the display corner 876.

Such an arrangement of the bend axis B and transverse support member 858 may be advantageous in devices in which design considerations dictate that the planar portion 828 of the display layer 804 may overlap the curved portion 832 at the display corner 876. For example, other components of the electronic device 700 may be located in such a way as to interfere with the planar portion 828 and the curved portion 832 overlapping one another as shown in FIGS. 5-7. Similarly, the arrangement of the bend axis B and transverse support member 858 shown in FIG. 8 may advantageously provide more robust structure and support for the display assembly 702 (and other components that may be attached to the display assembly 702) at the at least one display corner 876. It should be understood that while the transverse support member 858 is generally L-shaped to follow the contour of the display corner 876, the transverse support member 858 may instead extend rectilinearly or take on other curvilinear forms.

Figure 9:
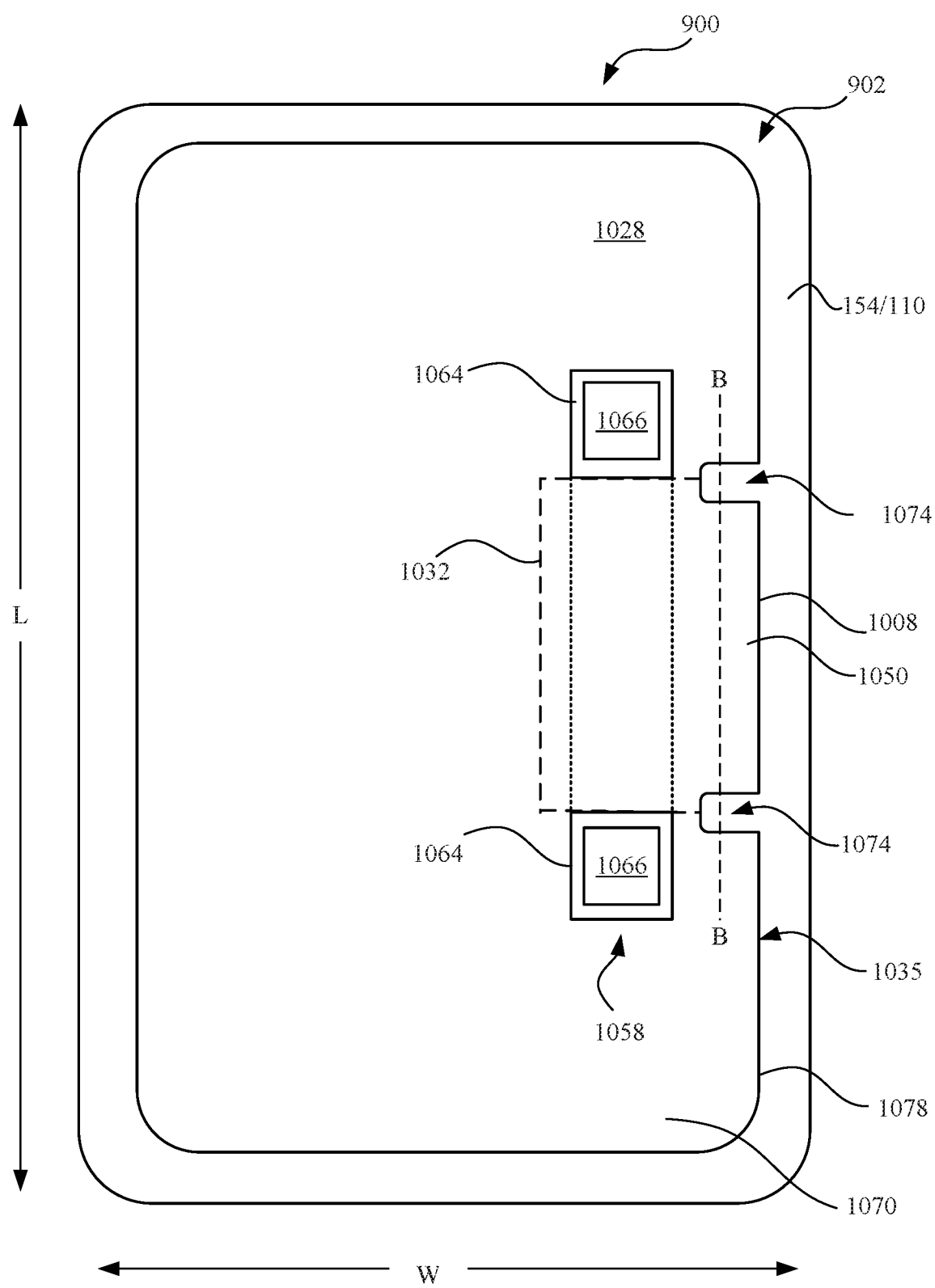
FIG. 9 illustrates a top view of an alternate embodiment of an electronic device, in accordance with some described embodiments.

FIG. 9 illustrates a top view of an alternate embodiment of an electronic device 900, with like numerals separated by a factor of 800, being used to show features corresponding to the embodiment of the electronic device 100 discussed above. As compared with the embodiment of the electronic device 500 shown in FIG. 7, the transverse support member 1058 and bend axis B can extend along the major dimension L of the electronic device 900 instead of extending along the minor dimension W. As in other embodiments, however, the transverse support member 1058 may define at least one end portion 1064 outside the overlap region 1050 for coupling to the support structure (e.g., frame 154). The planar portion 1028 of the display layer 1004 can define gaps 1074 between outward portions 1070 of the planar portion 1028 (portions extending outwardly along the major dimension L of the electronic device 900 toward the display periphery 1035) and the area in which the planar portion 1028 is contiguous with the curved portion 1032. The gaps 1074 may help minimize any stresses concentrated due to the bending of the display layer 1004 at the bend 1008.

The arrangement of the bend axis B and transverse support member 1058 along the major dimension L of the electronic device 900 may be beneficial in devices in which design considerations dictate that the planar portion 1028 of the display layer 1004 may overlap the curved portion 1032 along a display side 1078. For instance, other components of the electronic device 900 may be located in such a way as to interfere with the planar portion 1028 and the curved portion 1032 overlapping one another as shown in FIGS. 5-7. Also, the arrangement of the bend axis B and transverse support member 1058 shown in FIG. 9 may advantageously provide more robust structure and support for the display assembly 902 (and other components that may be attached to the display assembly 902) along the display side 1078. It should be understood that while the transverse support member 1058 is rectilinear, the transverse support member 1058 may instead take on other forms.

Figure 10:
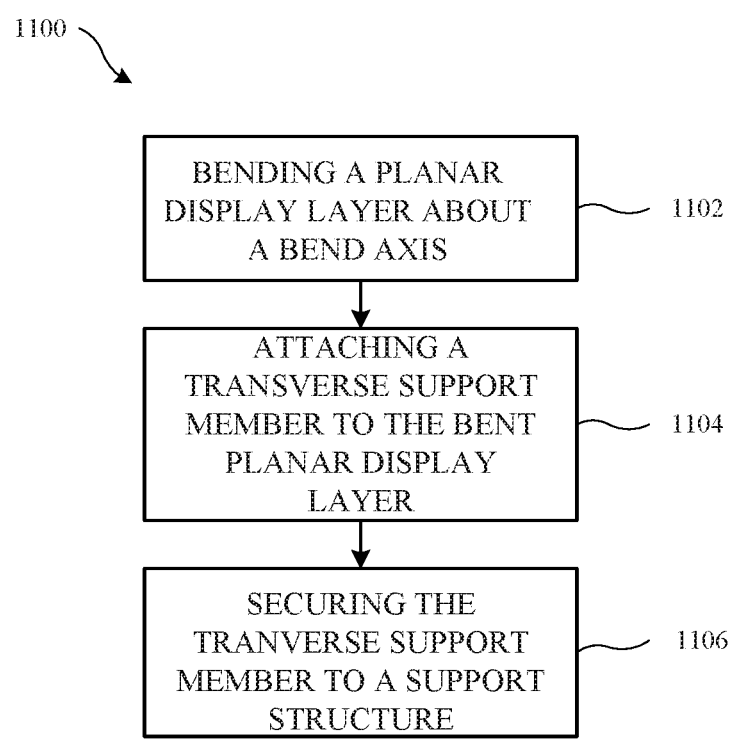
FIG. 10 illustrates a flowchart showing a method for forming a display assembly for an electronic device, in accordance with some described embodiments.

FIG. 10 illustrates a flowchart showing a process 1100 for forming a display assembly for an electronic device in accordance with the described embodiments. The process 1100 can be carried out by, 1102, bending a planar display layer about a bend axis. The process can continue, at 1104, by attaching a transverse support member to the bent planar display layer. The process can conclude, at 1106, by securing the transverse support member to a support structure.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

An electronic device having a housing is described. The electronic device includes a display assembly carried by the housing and comprising planar components secured together to form a stacked assembly. The planar components include a display layer including a planar portion extending along and disposed about a centerline and configured to present visual information and a curved portion that curves about an axis that is transverse to and offset from the centerline. In addition, the planar components include a support member that extends in a direction that is transverse to and offset from the centerline and aligned with the axis. The support member has an end portion coupled to a support structure and a central portion that is secured to the stacked assembly at the curved portion of the display layer.

In one embodiment, the support member defines a load path generally perpendicular to a direction of a shear force produced during a drop event. The direction of the shear force is generally parallel to the centerline.

In one embodiment, a transfer of a load along the load path during the drop event inhibits movement of the stacked assembly in the direction of the shear force.

In one embodiment, the curved portion that curves away from the planar portion and has a curved profile that is symmetric about the axis.

In one embodiment, the curved portion includes a display corner having an arcuate profile. The curved portion is at least partially supported by the support member that has an arcuate shape.

In one embodiment, the support structure is a frame that secures the display assembly to the housing.

In one embodiment, the support structure is the housing.

An electronic device is described that includes a display assembly including a display layer extending along a centerline and having a planar portion and a curved portion, wherein the planar portion includes an active region having imaging elements configured to present visual information, and wherein the curved portion includes an inactive region that includes an overlap region that is symmetric about a bend axis that is perpendicular to and offset from the centerline. The display assembly also includes a support structure capable of supporting the display assembly and a transverse support member that is coupled to the support structure and the display layer. The transverse support member also extends in accordance with the bend axis such that the transverse support member provides a load path capable of passing a load from the display assembly directly to the support structure.

In one embodiment, the planar portion of the display layer extends to a display periphery and the support structure at least partially surrounds the display periphery.

In one embodiment, the display periphery has a curved profile such that the visual information is presented in a manner that appears to curve away from the planar portion.

In one embodiment, the support structure includes a notch that at least partially receives the curved portion of the display layer.

In one embodiment, the electronic device further comprises a housing capable of carrying operational components, and wherein the housing is the support structure.

In one embodiment, the operational components include a processor and an optical image capture device in communication with the processor.

In one embodiment, the electronic device further includes an outer protective layer that includes a transparent material and that overlays the display assembly.

In one embodiment, the display assembly further includes a touch sensitive layer for detecting a touch input through the outer protective layer.

In one embodiment, the display assembly further includes a force sensitive layer configured to detect an amount of force applied to the outer protective layer associated with the touch input.

In one embodiment, the touch sensitive layer includes a connector and a flexible circuit couples to the touch sensitive layer at the connector and wraps around the display layer.

An electronic device is described that includes a housing capable of carrying components that include a processor and an optical imaging component in communication with the processor and capable of optically capturing an image for further processing. The components also include a display assembly in communication with the processor. The display assembly includes a display layer having a planar portion that is disposed about a centerline, a support structure that is coupled to the housing, and a transverse support member that couples together the display layer and the support structure, wherein the transverse support member is offset from and perpendicular to the centerline of the display layer such that the transverse support structure provides a load path from the display layer and the support structure.

In one embodiment, the transverse support member is formed of metal and is attached to the support structure with at least one of an adhesive and a weld.

In one embodiment, the display layer comprises an organic light emitting diode display.

As described above, one aspect of the present technology is the gathering and use of data available from various sources through the user interaction with the electronic device. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. An electronic device having a housing, the electronic device comprising:
    a display assembly carried by the housing and comprising planar components secured together to form a stacked assembly, the planar components including a display layer including: (a) a planar portion extending along and disposed about a centerline and configured to present visual information, and (b) a curved portion that curves about an axis that is transverse to and offset from the centerline, and
    a support member that extends in a direction transverse to and offset from the centerline and aligned with the axis, the support member having an end portion coupled to a support structure and a central portion that is secured to the stacked assembly at the curved portion of the display layer.

2. The electronic device of claim 1, wherein the support member defines a load path generally perpendicular to a direction of a shear force produced during a drop event, the direction of the shear force being generally parallel to the centerline.

3. The electronic device of claim 2, wherein a transfer of a load along the load path during the drop event inhibits movement of the stacked assembly in the direction of the shear force.

4. The electronic device of claim 1, wherein the curved portion curves away from the planar portion and has a curved profile that is symmetric about the axis.

5. The electronic device of claim 1, wherein the curved portion includes a display corner having an arcuate profile, wherein the curved portion is at least partially supported by the support member having an arcuate shape.

6. The electronic device of claim 1, wherein the support structure is a frame that secures the display assembly to the housing.

7. The electronic device of claim 1, wherein the support structure is the housing.

8. An electronic device, comprising:
    a display assembly including a display layer extending along a centerline and having a planar portion and a curved portion, wherein the planar portion includes an active region having imaging elements configured to present visual information, and wherein the curved portion includes an inactive region that includes an overlap region that is symmetric about a bend axis that is perpendicular to and offset from the centerline;
    a support structure capable of supporting the display assembly; and
    a transverse support member (i) that is coupled to the support structure and the display layer, and (ii) that extends in accordance with the bend axis such that the transverse support member provides a load path capable of passing a load from the display assembly directly to the support structure.

9. The electronic device of claim 8, wherein the planar portion of the display layer extends to a display periphery and the support structure at least partially surrounds the display periphery.

10. The electronic device of claim 9, wherein the display periphery has a curved profile such that the visual information is presented in a manner that appears to curve away from the planar portion.

11. The electronic device of claim 9, wherein the support structure includes a notch that at least partially receives the curved portion of the display layer.

12. The electronic device of claim 8, further comprising a housing capable of carrying operational components, and wherein the housing is the support structure.

13. The electronic device of claim 12, wherein the operational components include a processor and an optical image capture device in communication with the processor.

14. The electronic device of claim 8, further including an outer protective layer that includes a transparent material and that overlays the display assembly.

15. The electronic device of claim 14, wherein the display assembly further includes a touch sensitive layer for detecting a touch input through the outer protective layer.

16. The electronic device of claim 15, wherein the display assembly further includes a force sensitive layer configured to detect an amount of force applied to the outer protective layer associated with the touch input.

17. The electronic device of claim 15, wherein the touch sensitive layer includes a connector and a flexible circuit couples to the touch sensitive layer at the connector and wraps around the display layer.

18. An electronic device, comprising:
    a housing capable of carrying components that include:
    a processor,
    an optical imaging component in communication with the processor and capable of optically capturing an image for further processing, and
    a display assembly in communication with the processor and that includes (i) a display layer having a planar portion that is disposed about a centerline, (ii) a support structure that is coupled to the housing, and (iii) a transverse support member that couples together the display layer and the support structure, wherein the transverse support member is offset from and perpendicular to the centerline of the display layer such that the transverse support structure provides a load path from the display layer and the support structure.

19. The electronic device of claim 18, wherein the transverse support member is formed of metal and is attached to the support structure with at least one of an adhesive and a weld.

20. The electronic device of claim 18, wherein the display layer comprises an organic light emitting diode display.

* * * * *